United States Patent [19]

Ehlenz

[11] 4,188,447

[45] Feb. 12, 1980

[54] POLYMERIC FOAM CLEANING PRODUCT

[75] Inventor: Peter Ehlenz, Konigswinter-Vinxel, Fed. Rep. of Germany

[73] Assignee: Collo GmbH, Bornheim-Hersel, Fed. Rep. of Germany

[21] Appl. No.: 817,262

[22] Filed: Jul. 20, 1977

[30] Foreign Application Priority Data

Jul. 20, 1976 [DE] Fed. Rep. of Germany ....... 2632545

[51] Int. Cl.$^2$ ............................................... B32B 3/26

[52] U.S. Cl. ................................ 428/310; 15/104.93; 15/244 C; 252/91; 252/93; 252/92; 424/20; 427/202; 427/214; 428/323

[58] Field of Search ............................ 424/27, 28, 20; 252/91-93; 428/310, 323; 401/196; 427/212-214, 202; 15/244 C, 104.93; 521/159

[56] References Cited

U.S. PATENT DOCUMENTS

| | | | |
|---|---|---|---|
| 2,772,205 | 11/1956 | King | 424/28 |
| 3,076,298 | 2/1963 | Tundermann | 252/92 |
| 3,098,048 | 7/1963 | Shecanski et al. | 521/159 |
| 3,193,440 | 7/1965 | Schafer | 428/311 |
| 3,283,357 | 11/1966 | Decker et al. | 424/27 |
| 3,324,500 | 6/1967 | Fuller et al. | 252/92 |
| 3,341,488 | 9/1967 | O'Connor | 260/77.5 A |
| 3,810,841 | 5/1974 | Richter | 15/104.93 |
| 3,855,307 | 12/1974 | Rony et al. | 252/428 |
| 3,925,226 | 12/1975 | Takenouchi | 252/92 |
| 3,985,298 | 10/1976 | Nichols | 427/214 |

*Primary Examiner*—William A. Powell
*Assistant Examiner*—J. J. Gallagher
*Attorney, Agent, or Firm*—Cooper, Dunham, Clark, Griffin & Moran

[57] ABSTRACT

Sustained release compositions containing depots of active substances such as soaps, detergents, antimicrobial agents and the like dispersed in a flexible carrier which are slowly released during use.

6 Claims, No Drawings

POLYMERIC FOAM CLEANING PRODUCT

BACKGROUND OF THE INVENTION

This invention relates to sustained release compositions and products produced therefrom. More specifically, it relates to compositions and products comprising active substance depots dispersed in a flexible carrier suitably an adhesive or a polymeric foam. Still more specifically, and by way of example, it relates to cleaning products and compositions which slowly release a detergent over an extended period of time during use.

For ease of description, but without limitation, the products of this invention will be described principally as cleaning products. Those skilled in the art, however, will immediately appreciate that the concept and applicability of the invention is not limited to such products.

The preparation of cleaning products such as textiles, papers and foam sponges containing polishing or abrasive agents or covered with a layer of such materials is well known. These products are used for various purposes, such as household cleaning.

Additionally, attempts have been made to include certain active agents such as soaps, in the cleaning product to increase the cleaning effect. It has been observed, however, that these active substances are washed out and used up or lost within a very short period of use. The initial advantages of the products are, therefore, rapidly dissipated. Accordingly, the art has long been concerned with the production of products containing active substances which can be readily and economically produced, and which will retain their initial advantages over an extended period of time.

One such product is described in U.S. Pat. No. 3,334,374. In accordance with the invention described in that patent, pressure rupturable capsules, which may be regarded as analogous to the active substance depots of this invention, are contained within flexible, sealed receptacles. Such receptacles include, for example, thin, flat pouches with front and back walls sealed along their peripheral edges. The capsules are loosely contained within the receptacles. Such products are not completely satisfactory for a number of reasons, and have not found wide commercial acceptance.

THE INVENTION

Compositions and methods for their preparation, have now been discovered in accordance with this invention which meet the criteria aforesaid, and do not suffer the disadvantages of previously disclosed materials. Such compositions are readily converted to a number of useful commercial products, especially for household use.

The compositions of this invention are sustained release compositions for the controlled release of an active substance. The compositions comprise a mixture which is a flexible adhesive in which active substance depots are dispersed. The active substance depots comprise active substance particles coated with a thin protective coating which slowly decomposes during use by dissolving or by mechanical action to release the active substance. In certain aspects of the invention, the adhesive is replaced with a polymeric foam.

It is surprising to find that the adhesive or the foam which substantially immobilizes and encompass the active substance depots do not inhibit the controlled release of the active substance. It is especially surprising in view of the disclosure of the above identified patent which suggests many different structures all designed to maximize the mobility of the rupturable capsules, and expose their complete surfaces.

The active substances which can be employed in this invention are practically unlimited. They include substantially any material which can be provided in the form of relatively small particles or as a paste or a liquid. They include by way of example, but not of limitation, surfactants such as soaps, detergents and tensides; antimicrobial agents such as bacteriostatic, fungistatic, bacteriocidal and fungicidal agents; waxes and other polishing agents both natural and synthetic; polishing agents; cleaning solvents; corrosion inhibitors; skin treating agents such as creams, ointments, emollients, lotions, and sun screening agents; antistatic agents; perfumes; insect repellants; insecticides; and a host of similar materials. A large variety of active substances are illustrated in the examples.

The active substance may be solid, semiviscous or liquid. In any case, they are coated with a protective coating as described hereinafter.

If the active substances are solids, they are formed into particles by any convenient method, for example crushing or pulverizing, before coating. The particle size is generally about 20μ to 300μ, preferably from 20μ to 100μ. These particles are then coated to form active substance depots.

If the active substances are semiviscous or liquids such as oils, solvents, lotions, molten wax or the like, they are incorporated into the pores of a porous particulate carrier. The liquid or semiviscous material may be incorporated by any of three convenient methods.

One method is to heat the porous particles, add the active substance and cool. The effect of heating is to drive the air out of the pores, and create a low pressure. This pressure is normalized during cooling by the pores becoming filled, or nearly filled with active substance.

The second method is to place the porous particles in a vacuum, add the active substance and release the vacuum. Again the active substance moves into the pores to equalize the pressure differential.

A third method is simple impregnation by soaking the porous particles in the liquid to be absorbed.

In any event, the particle size of the filled porous carfier particles is from about 50μ to 500μ, preferably from 100μ to 200μ. After preparation, the particles are coated as in the case of dry particles.

The term "porous" is used in this description and claims to include not only those particles which contain a plurality of small pores but also particles which are essentially hollow spheres or hollow parts thereof. The presently preferred porous particles are mineral and synthetic foams such as pearlite, foamed glass, foamed clay and particles of synthetic foam, especially rigid foam particles from polyurethane or phenolic resin foams. Other suitable materials will be known to those skilled in the art.

Various coating materials may be employed in the process of this invention. These include soluble and insoluble film forming materials, both natural and synthetic. Suitable protective coatings may be formed, for example, from varnishes; enamels; laquers. Preferably a powder material is used such as powdered alkali and alkaline earth metal carbonates, phosphates, halides, sulfates, silicates, ammonium halides, silicic acid, silica, talcum powder and the like.

If a powder is used to form the protective coating, the average particle size of the powder is generally from about 0.01 to 0.2 times the size of the active substance particles. Preferably the size is about 0.1 that of the active substance particles.

If the coating material is a liquid, it can be formed on the active substance particles by dipping or spraying. If the coating material is a powder, the protective coating may be formed by turning or revolving the particles on a bed or layer of the powder, or by directing a jet of fine powder against the revolving particles.

The presently preferred coating materials are sodium chloride, sodium sulfate and ammonium chloride. These materials are readily available, easy to work with and relatively inexpensive. Additionally, especially with surfactants in a water medium, they appear to have a distinct gelling action which further controls the release of the active substance.

The active substance depots comprising the active substance particles coated with a protective coating of film or powder are dispersed in an insoluble, flexible adhesive or a polymeric foam to form the products of this invention. The products are principally intended for use in an aqueous environment as in the usual household cleaning. They may, however, be used dry, or in the environment of another liquid, for example a hydrocarbon or halogenated hydrocarbon employed in dry cleaning or cleaning metallic surfaces. The term "soluble" as used herein therefore should be understood in the light of the intended use of the product. While it usually should be understood to mean water soluble, it may have a broader meaning.

It is surprising to find that the active substance of the active substance depots is released in a controlled manner, even though the depots are embedded in the carrier material. While this invention should not be limited by theory, the present belief is that the protective coating is responsible for the controlled, sustained release.

With insoluble protective coatings, it appears that the adhesive bond is weakened with the result that on continued use the squeezing and pressing action breaks the adhesive bond and also fractures the protective coating itself. As a result, fine cracks and pores are formed in the adhesive through which the active substance slowly escapes.

If the protective coating is soluble, it dissolves so that fine pores are formed, and these, through mechanical action during use, ultimately form joining passages between each other and the surface. The active substance escapes through these passages.

With water soluble coatings, it has been observed that best results are obtained when the weight proportion of the coating, based on the total weight of the active substance particles, is up to about 6%. With water insoluble coatings, the comparable value is 20%. Appreciable variation can be tolerated without unacceptable losses in efficiency.

Any of a variety of insoluble, flexible adhesives may be used in the practice of this invention. The preferred are polyurethane adhesives, several of which are illustrated in the examples. However, other adhesives, both natural and synthetic, are useful. These include, for example, various phenolic and acrylic adhesives, as well as adhesives based upon polyamides, polyvinylchlorides, polyvinylacetates and other polyvinyl esters.

The adhesive with the dispersed active substance depot is coated onto the selected substrate which may be a polymer film; a fabric; paper, including paper reinforced with fabric; a fleece such as e.g. a spunbonded fleece; or, preferably, a foam. A synthetic foam is preferred because of its ability to absorb and hold water or other liquid. Normally, the products of this invention will be provided in the form of applicator pads comprising a foam, usually flexible, with a composition on one or both major surfaces. The composition is coated onto the substrate by knife coating, roller coating, wire coating, spraying or other selected technique.

Any of a variety of polymeric foams can be utilized in the practice of the invention, including all of those commonly employed for the preparation of household and industrial cleaning utensils. These include, for example, foams produced from natural or synthetic rubber latices; polyvinyl alcohol foam; polystyrene foams; foams produced from polyvinyl chloride; and the like. The presently preferred foams for use in the invention are polyurethane foams and foams produced from phenolic resins such as phenol formaldehyde resins.

The foams may be flexible, semi-rigid, or rigid. The relative degree of flexibility or softness of the foams can be controlled by known techniques. Products produced from flexible foams are especially suitable for household, cosmetic and personal hygiene use.

The foams may be reinforced with textile fabrics, polymer films, paper and similar materials. They may also be formed in layers, or produced in a wide variety of colors to enhance esthetic values.

The active substance depots may themselves be abrasive and, therefore, manifest a cleaning or polishing action. Alternatively, other abrasive materials, such as e.g. quartz dust, corundum, alumina, chalk, and the like, may be included in the carrier material, i.e. the adhesive or the foam.

The active substance depots may be dispersed in the adhesive or in the foam. In the latter case, they are preferably incorporated in the foam as it is formed. This process is illustrated in the examples.

There is, of course, no reason why an active substance depot need contain only one active substance, or that only one type of depot be included in a specific product.

The cleaning products, according to the invention, may be used for the cleaning of objects made of metal, enamel, plastics, ceramics, china, textiles, etc. They are particularly suitable for the household, for cosmetic purposes, for the care of automobiles and similar uses. The shape and size of the products can be widely varied.

The following non-limiting examples are given by way of illustration only. Examples 1 through 18 illustrate the preparation of the above substance depots.

EXAMPLE 1

A granular tenside sodium oleyl methyltauride, with a grain size of 50 to 100$\mu$, is by mixing and stirring dusted with fine grained sodium sulfate having a grain size of 2 to 5$\mu$. The fine grained sodium sulfate envelops the small tenside grains, thereby covering up its active surface.

EXAMPLE 2

As Example 1, except that instead of sodium sulfate, use is made of fine grained NaCl, having a grain size of 2 to 10$\mu$, for dusting and enveloping the small grains of sodium oleyl methyltauride.

EXAMPLE 3

As Example 1, except that instead of sodium sulfate, use is made of Aerosil ($SiO_2$) having a grain size of 0.1 to 1μ for dusting and enveloping the small grains of the tenside.

EXAMPLE 4

As a tenside for decreasing the surface tension of water, use if made of sodium olefinsulfonate having a grain size of 20 to 80μ, which is dusted and enveloped with fine grained NaCl having a grain size of 1 to 10μ.

EXAMPLE 5

As Example 4, except that use of Aerosil ($SiO_2$) is made having a grain size of 0.1 to 1μ for dusting and enveloping the small grains of sodium olefinsulfonate.

EXAMPLE 6

As a tenside use is made of granular paraffinsulfonate having a grain size of 50 to 150μ and, for dusting and enveloping, NaCl having a grain size of 1 to 5μ.

EXAMPLE 7

As Example 6, except that instead of NaCl use is made of Aerosil ($SiO_2$) having a grain size of 0.1 to 1μ for the dusting and enveloping.

EXAMPLE 8

Granular sodium metasilicate, which being greaseless has a soap-like action on grease, is reduced to a grain size of 20 to 100μ, and then by means of Aerosil ($SiO_2$) having a grain size of 0.1 to 1μ dusted and enveloped.

EXAMPLE 9

As Example 8, except that instead of Aerosil use is made of talcum powder having a grain size of 0.1 to 2μ.

EXAMPLE 10

As Example 8, except that instead of Aerosil use is made of calciumsilicate having a grain size of 0.1 to 1.0μ.

EXAMPLE 11

A commercial liquid disinfectant, known as "LYSOL", is added to porous pearlite material. For this purpose, pearlite grains, having a grain size between 100 and 200μ, are heated to a temperature of approximately 100° C. The air expands greatly in the pearlite grains, and escapes through the capillaries. At the addition of the cold LYSOL liquid, there occurs a cooling down of the pearlite grains, producing suction of the liquid LYSOL into the hollow pearlite elements. The thus produced pearlite grains contain liquid LYSOL in their pores, the amount of LYSOL amounting to 3 to 4 times the total weight of pearlite. The active substance particles are then mixed or stirred in finest grained sodium sulfate (grain size 2 to 5μ) to form the protective coating. This example is repeated using talcum or Äerosil instead of NaCl for forming protective coats.

EXAMPLE 12

The production of particles similar to those of Example 11 is modified by placing the granular pearlite material into a container, which is then evacuated. Then LYSOL solution is placed in the evacuated container, and becomes sucked into the pores of the pearlite grains. The thus produced particles are then provided with a powder coating as in Example 11. With this procedure, the weight ratio of LYSOL to pearlite is 8 to 1: i.e. the finest grain pearlite material absorbs about 8 times its own weight of LYSOL. This example is repeated using foamed glass or foamed clay in place of the pearlite.

EXAMPLE 13

As Example 11 or 12, except that instead of fine grained pearlite use is made of a synthetic foam powder, namely comminuted polyurethane rigid foam having a grain size between 100 and 300μ. With this material, it is not necessary to use either of the vacuum techniques. Products are prepared by simple impregnation.

EXAMPLE 14

As a tenside use is made of a 30% sodium olefinsulfonate solution which, as in Examples 11 to 13, is placed in pearlite or rigid polyurethane, and then coated with NaCl (2 to 10μ).

EXAMPLE 15

Bath oil, namely olive oil, is placed into a fine grained pearlite, having a grain size of 100 to 200μ, and the thus obtained particles are dusted with Aerosil (siO2) having a grain size of 0.1 to 1.0μ.

EXAMPLE 16

Silicon oil (molecular weight 300) is placed in foamed glass with a particle size of 150μ, and coated with talcum (grain size 0.1 to 2μ) by spraying the revolving particles with a stream of powder.

EXAMPLE 17

Perfume oil is placed into fine grained rigid polyurethane foam having a grain size of 50 to 100μ by the alternate heating and cooling vacuum technique and coated by rolling in a bed of finely divided calcium carbonate having a grain size of 0.2 to 1.0μ.

EXAMPLE 18

Paraffin having a melting point of 50° to 60° C. is heated until liquid, and then, using the technique of Example 11, and with a separate sample, the process of Example 12 is put into fine pore pearlite (grain size 100 to 200μ). The thus obtained particles are then coated with a fine powder tenside, namely sodium oleyl methyltauride, by rolling the particles in it.

EXAMPLE 19

A mixture is made of the following components:

| | Parts by Weight |
|---|---|
| Polyol (15% solution), namely polyester polyol linear with a medium range of cristallisation an 1-2% OH-groups in the end positions, having a molecular weight about 130 000 | 500 |
| Polyisocyante (75% solution) | 20 |
| Active substance depot of Example 1 with 20% $Na_2SO_4$ | 125 |

The first two components named form a polyurethane adhesive. A small amount of phthalate, namely benzyl-butyl-phthalate is added as a plasticizer.

The mixture is applied to polyurethane foam mats, about 20 mm thick at a level of 2.5 kg per square meter.

The density of the foam is 30 kg per cubic meter, and its porosity is 30 ppi.

After drying, the foam is cut into 10×15 pieces which are useful for cleaning glass, porcelain, enamel and the like.

EXAMPLE 20

A mixture is made of the following components:

| | Parts by Weight |
|---|---|
| Polyol as in Example 19 | 500 |
| Isocyanate (75% solution) as in Example 19 | 50 |
| Particles per Example 1 | 25 |
| Polishing clay (grain size 5 to 50 μ) for polishing and grinding | 100 |

The above mixture is coated on polyurethane foam mats in an amount of 2.5 kg per square meter, the thickness of the mats being 30 mm, for example. When dried, the foam is cut into 8×10 cm pads for cleaning pots and pans and other kitchen ware.

EXAMPLE 21

An intimate mixture is made of the following components:

| | Parts by Weight |
|---|---|
| Polyol of Example 19 | 500 |
| Isocyanate of Example 19 | 50 |
| Material of Example 14, with comminuted pearlite of grain size 0.1 to 0.2 mm and a bulk weight of 50 g/l (10 parts) and 30% in water (50 parts) of sodium olefinsulfonate and 5 parts sodium chloride | 50 |
| The depots of Example 8 | 25 |
| Polishing clay of grain size 5 to 50 μ | |

A homogenous mixture of these components is coated on a strip of flexible foam of polyvinylalcohol, which is then cut up into individual cleaners, suitable in particular because of the disinfecting action, for cleaning toilets, bathrubs, washbowls, articles from the sick room, and even for cleaning items used in stables.

EXAMPLE 22

One hundred parts by weight of a slightly branched polypropylene glycol ether (M.W. 2,500, OH-number 56) are mixed with 25 pts/wt of a preprocessed active substance depot, containing 10 parts pearlite (diam. 100μ, bulk density 100 g/l), 80 to 90 pts/wt paraffin sulfonate (50% in water) and 1 to 2 pts/wt finely pulverized NaCl.

To form a foaming mixture, there are added 51.5 pts/wt toluylene diisocyanate (TDI 80) and, as activators and other additives, 0.25 pts/wt Dabco [1,4-diaza(2,2,2) bicyclooctane triethylenediamine], 0.4 pts/wt tin dioctoate, 1.5 pts/wt copolymer of polysiloxane-polyalkylene oxide and 3.5 pts/wt water.

The resulting product is a flexible foam that releases the surfactants slowly when used in water. It is especially suitable for personal hygiene.

The active substance depots of this plastic foam cleaning product are foamed into the plastic foam and fixed in the cell structure.

EXAMPLE 23

Ten parts by weight polypropylene glycol ether (M.W. approx. 3,000, OH-number 56) and 90 pts/wt castor oil are mixed and reacted with 25 pts/wt of an active substance depot having the following composition:

10 pts/wt pearlite (diam. 100μ, 100 gm/L density)

65 pts/wt tenside, monionogenic (polyethylene-polypropylene adduct)

25 pts/wt n-alkyldimethylbenzyl ammonium chloride+n-alkyldimethylethylbenzyl ammonium chloride, 50% in water There are added for the foaming process, 61 pts/wt TDI 80 and 5.7 pts/wt of an activator mixture, consisting of:

0.5 pts/wt triethylene diamine 2.0 pts/wt polyether siloxane 3.2 pts/wt water and 2.0 pts/wt of a second activator mixture, consisting of:

0.4 pts/wt tin dioctoate 1.6 pts/wt polyether as diluent

The resulting product is a semi-rigid plastic foam with finely dispersed active substance depots, which release the active substances slowly when used in water. It is especially suitable as a cleaning product for the hands.

EXAMPLE 24

One hundred pts/wt polyether isocyanate with an NCO content of 7.2% and a viscosity of approximately 15,000 cps at 25° C., prepared from 60 pts/wt of a polypropylene glycol ether (diol) with an M.W. of approximately 2,000 (OH-number 50), 40 pts/wt of a polypropylene glycol ether (triol) with an M.W. of approximately 3,000 (OH-number 56) and 29.2 pts/wt TDI 80, are well mixed with 20 pts/wt of an active substance depot, consisting of 10 pts/wt pearlite (diam. 100 mμ, bulk density 100 gm/L), 88 pts/wt sodium alkyl polyglycol ether sulfate (30% in water) and dusted with 2 pts/wt of finest NaCl powder.

Added to this for the foaming process are 7.4 pts/wt TDI 80 and 6.2 pts/wt of an activator mixture consisting of 4.0 pts/wt ethyl morpholine and 2.2 pts/wt water. Also added is 1.0 pt/wt polydimethyl-siloxane.

The resulting product is a flexible plastic foam with finely dispersed active substance depots, which release the active substance slowly when used with water. It is suitable as a cleaning product for skin care.

EXAMPLE 25

One hundred pts/wt of a polyester consisting of 3 mol adipic acid, 3 mol trimethylol propane and 1 mol butylene glycol, with an OH-number of 205–220, are well mixed with 25 pts/wt of an active substance depot consisting of 10 pts/wt pearlite (diam. 100 mμ, bulk density 100/L), 80–90 pts/wt paraffin sulfonate (50% in water) and 1–2 gm finest NaCl powder for dusting. TDI (33 pts/wt) is added for the foaming process.

The resulting product is a rigid plastic foam especially suitable for the cleaning of grimy hands and the removal of calloused skin.

EXAMPLE 26

Eighty parts by weight of a polyester, consisting of adipic acid, diethylene glycol and hexane triol, and having a hydroxyl content of 1.7–2.0%, are agitated with 7 pts/wt of a 75% solution of a polyisocyanate of 1 mol trimethylol propane and 3 mol TDI in ethyl acetate, as well as 13 pts/wt ethyl acetate in a heated, closed vessel with agitator and reflux condenser for approximately 3 hours at ca. 70° C.

This prepolymer is well mixed with 4 pts/wt of an active substance depot consisting of 10 pts/wt pearlite (diam. 100 mμ; bulk density 50 gm/L) and 90 pts/wt tenside (nonionogenic), and with 12 pts/wt of a second active substance depot consisting of 10 pts/wt pearlite (as above) and 90 pts/wt paraffin wax (M.P. 50°-60° C.) and 0.8 pts/wt PU-color pigments. Added to this mixture are 20 pts/wt of a 75% solution of the polyisocyanate consisting of 1 mol trimethylol propane and 3 mol TDI in ethyl acetate.

This mixture is applied to one side of a flexible polyurethane foam sheet (20 mm thickness; open cells; specific weight approximately 40 kg/m$^3$) in an amount of approximately 500 gm/m$^2$. Rectangles (7×10 cm) are cut after drying and curing.

These cleaning products are suitable automobile care, etc.

EXAMPLE 27

The procedure is the same as Example 26, except that the active substance depots are replaced with 20 pts/wt of an active substance depot consisting of 10 pts/wt pearlite (diam. 100 mμ, bulk density 100 gmL), 88 pts/wt sodium polyglycol ether sulfate (30% in water), and 2 pts/wt finest NaCl powder. The resulting cleaning product is suitable for the cleaning of tiles, porcelain sinks, metals, enamel, in the kitchen and bathroom.

EXAMPLE 28

The procedure of Example 26 is used with 16 pts/wt of an active substance depot, consisting of 80 pts/wt sodium alkylpolyglycol ether sulfate, coated with 16 pts/wt tert. sodium phosphate and 4 pts/wt table salt.

The resulting cleaning product has no abrasive effect, but is especially suitable for the cleaning of glass and china, etc.

EXAMPLE 29

One hundred pts/wt of a solution (15%) of a polyester, consisting of adipic acid, diethylene glycol and hexane triol with a hydroxyl content 1.7-2.0%, are mixed with 5 pts/wt benzylbutyl phthalate as a plasticizer, 4 pts/wt PU-color pigment and 10 pts/wt of an active substance depot consisting of 10 pts/wt pearlite (diam. 100 bulk density 50 gm/L), 25 pts/wt tenside (nonionogenix), 65 pts/wt n-alkyldimethylbenzyl ammonium chloride and n-alkyldimethylethylbenzyl ammonium chloride (50% in water) and 12 pts/wt foam silica.

Added to this are 4 pts/wt of the reaction product of 1 mol trimethylol propane and 3 mol TDI (75% in ethyl acetate). The resulting paste is applied to a polyurethane sheet, as in Example 26. A cleaning product with a disinfectant action is obtained, suitable for bath tubs, sinks, toilets, tiles, etc.

EXAMPLE 30

One hundred pts/wt of the polyester described in Example 29 are well agitated with 10 pts/wt of the active substance depot described in Example 20, 12 pts/wt $Al_2O_3$ (polishing grade) and 1 pt/wt PU-color pigment. Then, 3.5 pts/wt of the reaction product of 1 mol trimethylol propane and 3 mol TDI (75%, dissolved in ethyl acetate) are added and mixed. This mixture is applied to a plastic foam sheet as in Example 26.

The resulting cleaning product is suitable for the cleaning of pots, pans, dishes of steel or enamel.

EXAMPLE 31

The procedure of Example 29 is used with 2 pts/wt of an active substance depot, consisting of 10 pts/wt pearlite (diam. 100μ, bulk density 100 gm/L), 90 pts/wt paraffin sulfonate (50% in water), 1 pt/wt NaCl (finest powder for dusting) and 2 pts/wt of an active substance depot consisting of 10 pts/wt pearlite (as above and 90 pts/wt paraffin wax (M.P. 50°-60° C.) and 12 pts/wt $Al_2O_3$ (polishing grade).

A cleaning product for the simultaneous cleaning and waxing of natural and artificial stone, e.g. window sills of marble, is obtained.

EXAMPLE 32

One hundred pts/wt of the polyester described in Example 29 are well mixed with 4 pts/wt plasticizer (benzylbutyl phthalate), 1 pt/wt PU-color pigment, 3 pts/wt of the active substance depot described in Example 23, 2 pts/wt titanium dioxide (anatase structure) and 12 pts/wt $Al_2O_3$ (polishing grade).

After the addition of 2.5 pts/wt of the polyisocyanate, trimethylolpropane and TDI reaction product described in Example 26, a cleaning product is obtained that is suitable for the disinfecting of milk cans, dairy equipment, equipment of meat and food processing plants.

EXAMPLE 33

One hundred pts/wt of the polyester described in Example 29 are well mixed with 4 pts/wt plasticizer (venzylbutyl phthalate), 1 pt/wt PU-color pigment, 10 pts/wt of an active substance depot consisting of 10 pts/wt pearlite (diam. 100μ, bulk density 100 gm/L), 50 pts/wt tenside (nonionogenic), 20 pts/wt paraffin oil, 20 pts/wt dimethyldistearyl ammonium chloride (75% in isopropanol) and with 12 pts/wt foam silica.

To this are added 3.0 pts/wt of a reaction product of 1 mol trimethylol propane and 3 mol TDI and the mixture is processed according to Example 26.

The result is a cleaning product suitable for the cleaning and polishing of light metals, offering the added benefit of lasting rust protection.

EXAMPLE 34

One hundred pts/wt of the polyester described in Example 29 are well mixed with 4 pts/wt plasticizer (benzyl-butyl phthalate), 1 pt/wt PU-color pigment, 4 pts/wt of an active substance depot consisting of 10 pts/wt pearlite (diam. 50-100 mμ, bulk density 100 gm/L), 5 pts/wt dodecyl mercaptan (to protect against tarnishing), 5 pts/wt of a fragrance, 80 pts/wt tenside (nonionogenic) and 15 pts/wt foam silica. After the addition of 3.5 pts/wt of the reaction product of 1 mol trimethylol propane and 3 mol TDI (75% in ethyl acetate), the mixture is processed according to Example 26.

The resulting cleaning product is suitable for the cleaning of silver (flatware), copper and brass. A lasting protection against tarnishing is achieved.

EXAMPLE 35

One hundred pts/wt of the polyester described in Example 29 are well mixed with 4 pts/wt plasticizer (benzyl-butyl phthalate), 1 pt/wt PU-color pigment paste and 20 pts/wt of an active substance depot consisting of 10 pts/wt pearlite (diam. 100 mμ, bulk density 50 gm/L), 60 pts/wt paraffin sulfonate (50% in water), 30 pts/wt tenside (nonionogenix) and 2 pts/wt NaCl (finest powder for dusting).

Added to this are 3.5 pts/wt of the reaction product of 1 mol trimethylol propane and 3 mol TDI (75% in ethyl acetate).

Further processing according to Example 26 results in a cleaning product suitable for the cleaning of grimy, spotted and greasy textiles.

EXAMPLE 36

The procedure is the same as Example 35 except for the use of 20 pts/wt of an active substance depot consisting of 10 pts/wt pearlite (diam. 100 mμ, bulk density 50 gm/L), 10 pts/wt polyglycol 600, 80 pts/wt paraffin sulfonate (50% in water) and 1–2 pts/wt NaCl (finest powder for dusting).

After the addition of 3.0 pts/wt of the reaction product of 1 mol trimethylol propane and 3 mol TDI, further processing is carried out as in Example 26 to provide cleaning products suitable for the cleaning of carpeting. Synthetic carpets become antistatic.

EXAMPLE 37

The procedure is the same as in Example 35 except for the use of 5 pts/wt of an active substance depot consisting of 10 pts/wt pearlite (diam. 100 mμ, bulk density 50 gm/L), 40 pts/wt tenside (nonionogenic), 50 pts/wt of the antistatic agent dimethyl distearyl ammonium chloride (75% in isopropanol) and 12 pts/wt foam silica. After the addition of 5 pts/wt of the reaction product of 1 mol trimethylol propane and 3 mol TDI (75% in ethyl acetate) and further processing according to Example 26, cleaning products are obtained that are suitable for the cleaning of pastic materials. A strong antistatic effect is achieved at the same time.

EXAMPLE 38

One hundred pts/wt of the polyester described in Example 29 are mixed with 1 pt/wt PU-color pigment and with 5 pts/wt of an active substance depot consisting of 10 pts/wt pearlite (diam. 100 mμ, bulk density 150 gm/L) and 90 pts/wt silicone oil Mg 300 together with 10 pts/wt $Al_2O_3$ (polishing alumina) and 4 pts/wt quartz powder.

After the addition of 1 pt/wt TDI and further processing according to Example 26, polishing and cleaning products for cleaning iron and steel are obtained. The silicone oil produces a protective film on the metal.

EXAMPLE 39

One hundred pts/wt of the polyester described in Example 29 are mixed with 4 pts/wt plasticizer (benzylbutyl phthalate), 1 pt/wt PU-color paste and 20 pts/wt of an active substance depot consisting of 80 pts/wt sodium alkylpolyglycol sulfate, coated with 20 pts/wt sodium tripolyphosphate (wetting agent) and 2 pts/wt NaCl (finest powder).

After the addition of 3 pts/wt of the reaction product of 1 mol trimethylol propane and 3 mol TDI, the mixture is applied to a sheet of polyurethane foam with a structure of natural sponge and a surface profile. The result is a cleaning product for personal hygiene.

EXAMPLE 40

The procedure is the same as Example 39 except for the use of 20 pts/wt of an active substance depot consisting of 80 pts/wt sodium polyglycol ether sulfate, 10 pts/wt fatty acid alkylolamide polyglycol ether (to restore oils to the skin), coated with 10 pts/wt polyvinyl alcohol.

The resulting cleaning product is suitable for personal hygiene, restores oil to the skin, and protects it.

EXAMPLE 41

The procedure of Example 26 is employed except for the use of 20 pts/wt of an active substance depot, consisting of 80 pts/wt paraffin sulfonate coated with 16 pts/wt tert. sodium phosphate and 4 pts/wt NaCl (finest powder).

The resulting cleaning product lathers freely and is suitable for personal hygiene.

EXAMPLE 42

One hundred parts by weight of the polyester described in Example 29 are mixed with 10 pts/wt of an active substance depot consisting of:

40 pts/wt polyurethane granules of rigid foam (diam. to 300 mμ, 250 gm/L bulk density)

40 pts/wt tenside (nonionogenic) (polyethylene-polypropylene adduct)

15 pts/wt n-alkyldimethylbenzyl ammonium chloride+n-alkyldimethylethylbenzyl ammonium chloride (50% in water)

3 pts/wt sodium chloride (finest powder)

2 pts/wt finely dispersed silicic acid and applied to one side of a flexible polyurethane foam sheet, as in Example 26.

Rectangles are cut after drying and curing.

The resulting cleaning product is suitable for the intensive cleaning and disinfection of bathtubs and sinks.

EXAMPLE 43

One hundred parts by weight of the polyester described in Example 29 are mixed with 15 pts/wt of an active substance depot consisting of:

45 pts/wt phenolic resin plastic foam granulate (diam. to 300 mμ, bulk density 300 gm/L)

52 pts/wt sodium polyglycol ether sulfate (30% in water)

3 pts/wt sodium chloride (finest powder for dusting)

and applied to a flexible polyurethane foam sheet, as in Example 26. After curing, this is cut into rectangular pieces (7×10 cm.). The resulting cleaning product is suitable for the cleaning of plastics, lacquered surfaces and glass windows.

In the above examples relating to a product where the active substance depots are embedded in and fixed by a polyurethane adhesive other known adhesives such as phenolic and acrylic adhesives as well as adhesives based upon polyamides, polyvinylchloride, polyvinylacetate and the like may be used while said polyurethane adhesive is preferred. It is of importance that the active substance depots are fine dispersed in the adhesive and are embedded in the adhesive layer so that at least the major part of said depots are fully enclosed and enveloped by said adhesive. By this the active substance is released in the desired controlled manner so that the effectivity of the pad or the like is maintained over a long period of use.

While use of a flexible foam material having open pores is preferred other materials such as fabrics, impregnated or laminated papers, fleeces or foils etc. may be used as a substrate or carrier material in accordance of the invention.

What is claimed is:

1. A sustained release cleaning product for the controlled release of a surfactant comprising active substance depots which are porous particles with at least one absorbed surfactant, said porous particles being coated with a thin protective powder coating, said active substance depots being dispersed in a polymeric foam, said protective powder coating comprising powders of inorganic materials selected from the group consisting of sodium chloride, sodium sulfate and ammonium chloride.

2. A product of claim 1 wherein the porous particle is pearlite, the coating is sodium chloride, the foam is polyurethane, and the surfactant is selected from the group consisting of sodium oleyl methyl taurid, sodium olefin sulfonate and paraffin sulfonate.

3. A product of claim 1 wherein the porous particle is rigid polyurethane, the coating is sodium chloride, the foam is polyurethane, and the surfactant is selected from the group consisting of sodium oleyl methyl taurid, sodium olefin sulfonate and paraffin sulfonate.

4. A sustained release cleaning composition for the controlled release of a surfactant comprising a mixture of a flexible polyurethane adhesive having dispersed therein active substance depots, said depots comprising porous particles with at least one absorbed surfactant, said porous particles being coated with a thin protective powder coating of a substance selected from the group consisting of sodium chloride, sodium sulfate, ammonium chloride, and silica, said composition being coated on a substrate selected from the group consisting of polymer films, paper, fabric, fleeces and foams.

5. A composition of claim 4 wherein the porous particle is pearlite, the coating is sodium chloride, the foam is polyurethane, and the surfactant is selected from the group consisting of soidium oleyl methyl taurid, sodium olefin sulfonate and paraffin sulfonate.

6. A composition of claim 4 wherein the porous particle is rigid polyurethane foam, the coating is sodium chloride, the foam is polyurethane, and the surfactant is selected from the group consisting of sodium oleyl methyl taurid, sodium olefin sulfonate and paraffin sulfonate.

* * * * *